United States Patent
Allen et al.

(10) Patent No.: US 7,983,997 B2
(45) Date of Patent: Jul. 19, 2011

(54) INTERACTIVE COMPLEX TASK TEACHING SYSTEM THAT ALLOWS FOR NATURAL LANGUAGE INPUT, RECOGNIZES A USER'S INTENT, AND AUTOMATICALLY PERFORMS TASKS IN DOCUMENT OBJECT MODEL (DOM) NODES

(75) Inventors: James F. Allen, Pensacola, FL (US); Nathanael Chambers, Stanford, CA (US); Lucian Galescu, Pensacola, FL (US); Hyuckchul Jung, Gulf Breeze, FL (US); William Taysom, Pensacola, FL (US)

(73) Assignee: Florida Institute for Human and Machine Cognition, Inc., Pensacola, FL (US)

( * ) Notice: Subject to any disclaimer, the term of this patent is extended or adjusted under 35 U.S.C. 154(b) by 813 days.

(21) Appl. No.: 11/982,668

(22) Filed: Nov. 2, 2007

(65) Prior Publication Data

US 2009/0119587 A1 May 7, 2009

(51) Int. Cl.
*G06F 11/00* (2006.01)
(52) U.S. Cl. ......................................................... 706/12
(58) Field of Classification Search .............. 706/45–48, 706/62, 12; 704/2, 9, 231, 246, 251; 707/713, 707/736, 769, 771, 772
See application file for complete search history.

(56) References Cited

U.S. PATENT DOCUMENTS

| | | | | |
|---|---|---|---|---|
| 6,728,692 B1 * | 4/2004 | Martinka et al. | ................. | 706/45 |
| 7,062,452 B1 * | 6/2006 | Lotvin et al. | .................... | 705/26 |
| 7,647,228 B2 * | 1/2010 | Silvera et al. | ................. | 704/275 |
| 7,693,900 B2 * | 4/2010 | Wilmering et al. | ........... | 707/713 |
| 2004/0102201 A1 * | 5/2004 | Levin | ............................ | 455/466 |
| 2007/0179833 A1 * | 8/2007 | Moorthy et al. | ................ | 705/10 |
| 2008/0249775 A1 * | 10/2008 | Chiu et al. | ..................... | 704/257 |

OTHER PUBLICATIONS

Jung et al., One-Shot Procedure Learning from Instruction and Observation, May 11, 2006, AAAI, International FLAIRS Conference 2006 Melbourne, FL, pp. 676-681.*
Chambers et al., Using Semantics to Identify Web Objects, Jul. 2006, AAAI, pp.1259-1264.*
AAAI, Twenty-First National Conference on AI, Jul. 16-17, 2006, pp. 1.*
Allen, et al., Demonstration of PLOW: A Dialog System for One-Shot Task Learning, Apr. 2007, Proceedings of Human Technologies, NAACL-HLT, pp. 1-2.*
Sutcliffe, Report on the 19th International FLAIRS Conference, May 2006, AAAI, pp. 1.*

(Continued)

*Primary Examiner* — David R Vincent
(74) *Attorney, Agent, or Firm* — J. Wiley Horton

(57) ABSTRACT

A system which allows a user to teach a computational device how to perform complex, repetitive tasks that the user usually would perform using the device's graphical user interface (GUI) often but not limited to being a web browser. The system includes software running on a user's computational device. The user "teaches" task steps by inputting natural language and demonstrating actions with the GUI. The system uses a semantic ontology and natural language processing to create an explicit representation of the task that is stored on the computer. After a complete task has been taught, the system is able to automatically execute the task in new situations. Because the task is represented in terms of the ontology and user's intentions, the system is able to adapt to changes in the computer code while still pursuing the objectives taught by the user.

17 Claims, 13 Drawing Sheets

OTHER PUBLICATIONS

One-Shot Procedure Learning from Instruction and Observation; Published May 11, 2006 in AAAI International FLAIRS Conference. See RH col., p. 676 through LH col., p. 677; p. 679 LH col. ("Learning Primitive Steps") through p. 680 RH col. ("Transfer of Knowledge").

Using Semantics to Identify Web Objects; Published Jul. 16, 2006 in AAAI 21st Conference on AI. See p. 1259 RH col. ("Procedure Learning on the Web") through p. 1261 LH col.; p. 1262 LH col. ("Book Search Evaluation") through p. 1264 LH col. ("Transfer Learning Results").

Report on the Nineteenth International FLAIRS Conference; Published late 2006.

Demonstration of Plow, Published Apr. 2007 in Proceedings of Human Language Technologies NAACL-HLT. See p. 1 RH col. ("The Plow System") through p. 2 LH col.

* cited by examiner

○○○ | http://www.mapquest.com/ | ○○○ hotels ▽

Address or Intersection

1018 E. De Soto St.

City

Pensacola

State

FL

ZIP 32501-3362

Search

1. Residence Inn - dwntwn
   601 E. Chase St., Pensacola, FL (0.64 miles away)
   850-432-0202
   Map ˙ Directions To ˙ Directions From 2. Crowne Plaza
   200 E. Gregory St., Pensacola, FL (0.67 miles away)
   850-433-7572
   Map ˙ Directions To ˙ Directions From 3. Crowne Plaza Pensacola Grand
   200 E. Gregory St., Pensacola, FL (0.71 miles away)
   850-433-3336
   Map ˙ Directions To ˙ Directions From More Results Procedure "FIND HOTEL NEAR ADDR"
- GO TO THE WEB PAGE
  → OPEN-URL:object
    http://www.mapquest.com
  → WAIT-CONDITION: content open-uri
- PUT THE HOTEL
  → FIND-OBJECT: in-order-to
  → FILL-FIELD: object (value
- PUT THE CITY
  → FIND-OBJECT: in-order-to
  → FILL-FIELD: object (value
- PUT THE STATE
  → FIND-OBJECT: in-order-to
  → FILL-FIELD: object (value
- PRESS SEARCH BUTTON
  → FIND-OBJECT: in-order-to
  → CLICK-LINK: object(value of
- FIND THE HOTEL LIST
  → FIND-OBJECT: in-order-to
  → FILL-FIELD: object (value
- PARSE
  → PARSE-TABLE: data (value of USR>HERE IS THE LIST OF RESULTS
SYS>ALLRIGHT
SYS>HOW MANY MORE RESULTS SHOULD I RETRIEVE?
USR>ALL THAT ARE LESS THAN 5 MILES AWAY
SYS>ALLRIGHT

FIG. 12

| HOTEL NAME | DISTANCE |
|---|---|
| Hospitality Inn | 4.76 miles |
| Mona Lisa Motel | 4.87 miles |
| Tranquil Vibes | 4.91 miles |

Hospitality Inn
4910 Mobile Hwy,Pensacola, FL (4.76 miles away)
850-932-9314
- Map
- Directions To
- Directions From Mona Lisa Motel
4950 Mobile Hwy,Pensacola, FL (4.87 miles away)
850-455-0336
- Map
- Directions To
- Directions From Tranquil Vibes
5221 Flaxman St,Pensacola, FL (4.91 miles away)
850-455-3675
- Map
- Directions To
- Directions From

FIG. 13

INTERACTIVE COMPLEX TASK TEACHING SYSTEM THAT ALLOWS FOR NATURAL LANGUAGE INPUT, RECOGNIZES A USER'S INTENT, AND AUTOMATICALLY PERFORMS TASKS IN DOCUMENT OBJECT MODEL (DOM) NODES

STATEMENT REGARDING FEDERALLY SPONSORED RESEARCH OR DEVELOPMENT

The work described herein was funded by the Defense Advanced Research Projects Agency, via a subcontract from SRI International.

CROSS-REFERENCES TO RELATED APPLICATIONS

Not Applicable.

MICROFICHE APPENDIX

Not Applicable

BACKGROUND OF THE INVENTION

1. Field of the Invention

This invention relates to the field of task automation. More specifically, the invention comprises a system allowing a user to teach a computational device repetitive tasks using natural language communication and task demonstrations.

2. Description of the Related Art

Computers have been previously used to automate many complex tasks. One of the simplest forms of task automation is the creation of a "macro." A "macro" performs a series of keystrokes previously defined by a user. The "macro" is often triggered by a single key stroke or command phrase. Once triggered, the macro is then capable of carrying out a complex series of tasks.

Many software applications provide macro capabilities. However, those using macros readily understand their limitations. A macro contains no innate knowledge of the process it is performing. Rather, it is simply a rote issuance of a series of previously-demonstrated user actions. Thus, a macro created in one software application is of no use when running a different application. Even within the same application, a macro may not remain viable when the application is revised. A simple change in menu location or terminology will render the macro useless. Thus, while macros serve to illustrate the possibilities of automation, their utility is limited.

The present invention can be configured to apply to virtually any computational device employing a graphical user interface ("GUI"), including computers, cell phones, video recorders, iPods, ATM's etc. Personal computers running applications such as Microsoft Windows will likely be its most common application. The techniques can apply to many hard-coded applications, such as spreadsheets and word processors. However, the invention will likely be most useful within web browsers. In order for the user to appreciate the scope of the invention's application, some detailed background regarding computer operations over the Internet may be helpful.

The computing environment has undergone a substantial transformation in the past two decades. Computers were historically isolated from each other, with data communications only occurring at specified times and in a limited fashion. The advent of the worldwide computer network known as the Internet has irrevocably altered this paradigm. Most computers are now in constant communication with hundreds of other computers. A communication protocol which allows data exchange over a virtually limitless number of platforms and operating systems was needed in order to allow this data exchange. HyperText Markup Language ("HTML") has largely filled this need. As those skilled in the art will know, HTML allows communication using only a set of ASCII characters. A hosting computer—generally known as a "server"—transmits a series of instructions to a client computer that has logged into the server.

The instructions are typically a series of ASCII characters in the HTML format. The client computer runs an HTML-decoding application known as a "web browser." The web browser takes the HTML code—which maybe thought of as a series of instructions—and uses it to create the display of the web page on the client computer's monitor. The instructions can be used to create blocks of text, place photographs, etc.

Of course, the instructions can also be used to create interactivity. The person viewing the web page on a browser may be allowed to make certain selections, enter text data, and even upload additional data such as photographs or videos. Once the client computer is asked to submit the interactive responses, another ASCII transmission is sent from the client computer back to the hosting server.

Those skilled in the art will know that the data transfer protocols have now evolved beyond the original HTML. Extensible Markup Language ("XML") was created to add more structure to the existing—somewhat freeform—world of HTML. Features of XML were eventually combined with existing HTML code to create XHTML. Cascading Style Sheets ("CSS") are often used to create layered complexity. In addition, "scripts" are used to carry out a variety of functions, with JavaScript being the de facto standard for this purpose.

Because all these components must interact with a variety of platforms over the Internet, the code used tends to be open. A user viewing a website can typically open the code used to create the display of the site on his or her computer (though the CSS and JavaScript components may only be partially visible). Thus, whereas the source code of most applications running on a computer is difficult to open (and even more difficult to analyze), Internet transfer source code is easy to open (and readily understood by those skilled in the art). The open nature of HTML and comparable code allows a user to "see" many of the functions a particular website presents.

This feature is especially useful in dealing with interactive websites. An interactive website is one which solicits input from the client-user. A good example is the website known as AMAZON.COM. This website allows a client-user to request searches of available inventory. The search request data is transmitted from the client-user to the host-server. The host-server, or more commonly another linked system, then conducts the search and reports the results back to the client-user.

The interaction between the client-user and the host-server can be observed and analyzed by studying the HTML (and other) code that is transmitted back and forth between the two systems. A "macro" can be created to interact with the host-server. It would function much like the prior art "macros" designed to run within specific applications. However, the open nature of the code used to transmit information over the Internet allows for functionality far beyond simply recording and repeating a sequence of user inputs. A much more sophisticated level of automation is possible. A system which identifies a user's intent and then "learns" how to carry out that intent is possible. Such a system is robust, in that it can adapt to changes in the host-server's website and potentially even apply the lessons learned in interacting with a first website to make choices regarding how best to interact with a second and different website. The present invention achieves these objectives.

BRIEF SUMMARY OF THE INVENTION

The present invention comprises a system which allows a user to teach a computational device how to perform complex, repetitive tasks. The system includes software running on a user's computational device. The user provides input to the software in at least two distinct ways. First, the user speaks to the computer or types words into the computer using natural language. A language understanding module interprets the language and produces a semantic representation based on some ontology. Second, the user demonstrates certain actions. The demonstrated actions include things like moving a pointing device to demonstrate a location, actuating a button on a pointing device to make a selection, and typing characters on a keyboard.

The software receives the user's input and processes the input through an intent recognition component, which seeks to determine what the user wishes to do. The software then provides information back to the user. The information can take the form of querying statements if the intent recognition component is unable to discern the user's intent, or confirming statements if the user's intent has been established.

The system can function in many different computing environments. As a first example, the system can be configured to run within stand-alone programs such as spreadsheets or word processors. As a second example, the system can be configured to function in a web-based environment in which information is transferred using HTML, XHTML, CSS, and/or scripts. HTML code will cause the display of words that are visible on the client-user's monitor. In addition, however, the code itself is often accessible through the web browser. The present invention uses all the code (displayed and non-displayed portions) in learning a step in a task. It accomplishes this by using two resources: a semantic ontology and a word lexicon. When the user utters words describing an action ("Let me teach you how to buy a book"), the system translates the words into ontological concepts (Action: BUY; Object: BOOK). The system "learns" in a fashion that resembles human learning. It starts with a reference lexicon, then expands its knowledge as it is taught additional tasks. The system will become more flexible and adaptive as it stores more learned tasks. Once a task has been successfully taught to the system, a user can ask the system to perform that task. The system will then execute the steps it previously learned.

The system identifies task input parameters using three sources: First, it uses the initial task description to define an objective. The system identifies ontological properties of the objective. If, as an example, the objective is buying a book, the system identifies the objective as a book and identifies the ontological properties of a book, such as the fact that it will have a title and that it will have been created by an author. Second, the system identifies parameters by observing which user actions require the inputting of text by the user. Third, the system identifies input parameters by recognizing user statements which require one.

The system is also capable of recognizing and executing iterative steps. This is particularly helpful when performing actions on a list of objects—such as when a web search engine returns a list of results. An alternative graphical user interface is preferably provided for the list-based operations.

BRIEF DESCRIPTION OF THE SEVERAL VIEWS OF THE DRAWINGS

FIG. 1 shows what a graphical user interface implementing the present invention might look like.

FIG. 8 shows the website of FIG. 7 with a search result displayed.

FIG. 10 shows an alternate graphical user interface used to display lists.

FIG. 11 shows the graphical user interface of FIG. 10, showing how the system can extract list information.

FIG. 12 shows still another exemplary website and a search result.

FIG. 13 shows the graphical user interface of FIG. 12, displaying extracted list information.

REFERENCE NUMERALS IN THE DRAWINGS

| 10 | graphical user interface | 12 | browser display |
| 14 | URI entry box | 16 | PLOWS display |
| 18 | movable cursor | 20 | speech interface display |
| 22 | user-typed input | 24 | user speech |
| 26 | system speech | 28 | transmit button |
| 30 | title entry box | 32 | intent recognition module |
| 34 | user | 36 | language understanding module |
| 38 | action monitoring module | 40 | collaborative actor module |
| 42 | task execution module | 44 | task learning module |
| 46 | task database | 48 | entry box |
| 50 | label | 52 | task label |
| 54 | sub-task label | 56 | search category box |
| 58 | text entry box | 60 | search result display |
| 62 | image link | 64 | text link |
| 66 | DOM node | 68 | demarcated DOM node |
| 70 | parsed item GUI | 72 | demonstrated title |
| 74 | iterated title | 76 | proximity search input |
| 78 | search result | | |

DETAILED DESCRIPTION OF THE INVENTION

The present invention incorporates a variety of concepts which are difficult to initially grasp in the abstract. Accordingly, this description will begin with a specific example. Once the application of the invention to this specific example is initially explored, a more general description of the system architecture will be provided. The initial example presents a series of steps which resemble a sophisticated macro. However, the system is capable of functioning at a much higher level which actually resembles human learning. The higher-level functions will also be explained subsequently.

This specific example involves web-based operations. As stated previously, the inventive system can be configured to run within a web browser. The system would then include software running on a user's computer. The software is referred to as "PLOW," which is an acronym standing for "Procedural Learning on the Web." A graphical user interface ("GUI") is preferably provided so that the user can easily monitor PLOW's actions. Those skilled in the art will know that a GUI can assume a virtually endless variety of forms. Thus, the graphical depictions shown in the accompanying figures should be properly viewed as one rather simple example among many possibilities.

Figure 1:
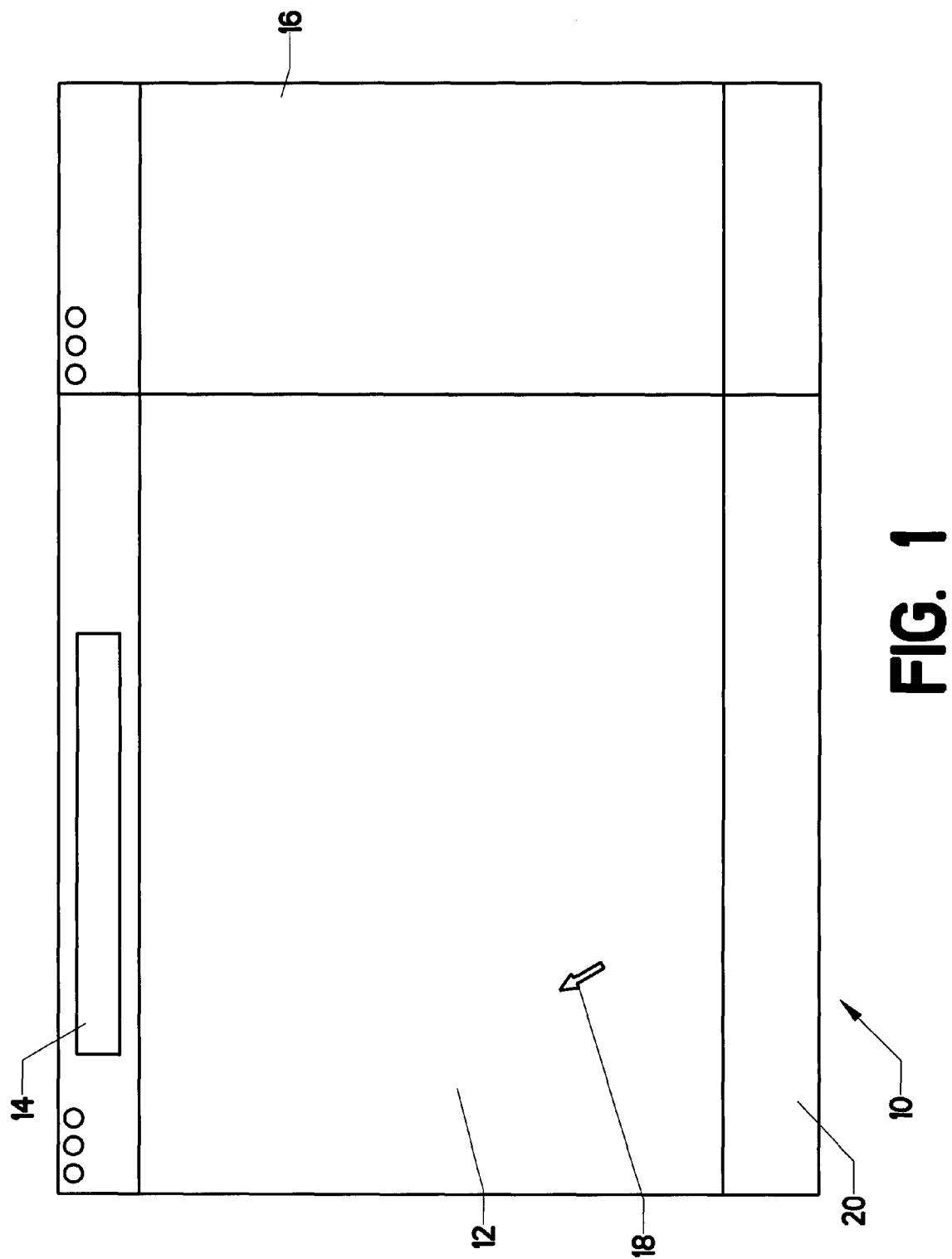

FIG. 1 shows a representative graphical user interface 10. Browser display 12 is presented on the left side of the display area. It is opened in a conventional window, having "maximize," "minimize," and "close" features. URI entry box 14 is displayed near the windows top (though as this is a function of the web browser used, it could appear anywhere). Movable cursor 18 is shown in the display. It moves when the user moves a pointing device such as a computer mouse.

Task log 16 is presented on the right side of the display area. The task log shows the tasks that have been learned so far in this learning session. Speech interface display 20 is presented across the bottom of the display area. These displays allow the user to monitor his or her interaction with PLOW, as will be explained momentarily.

Figure 2:
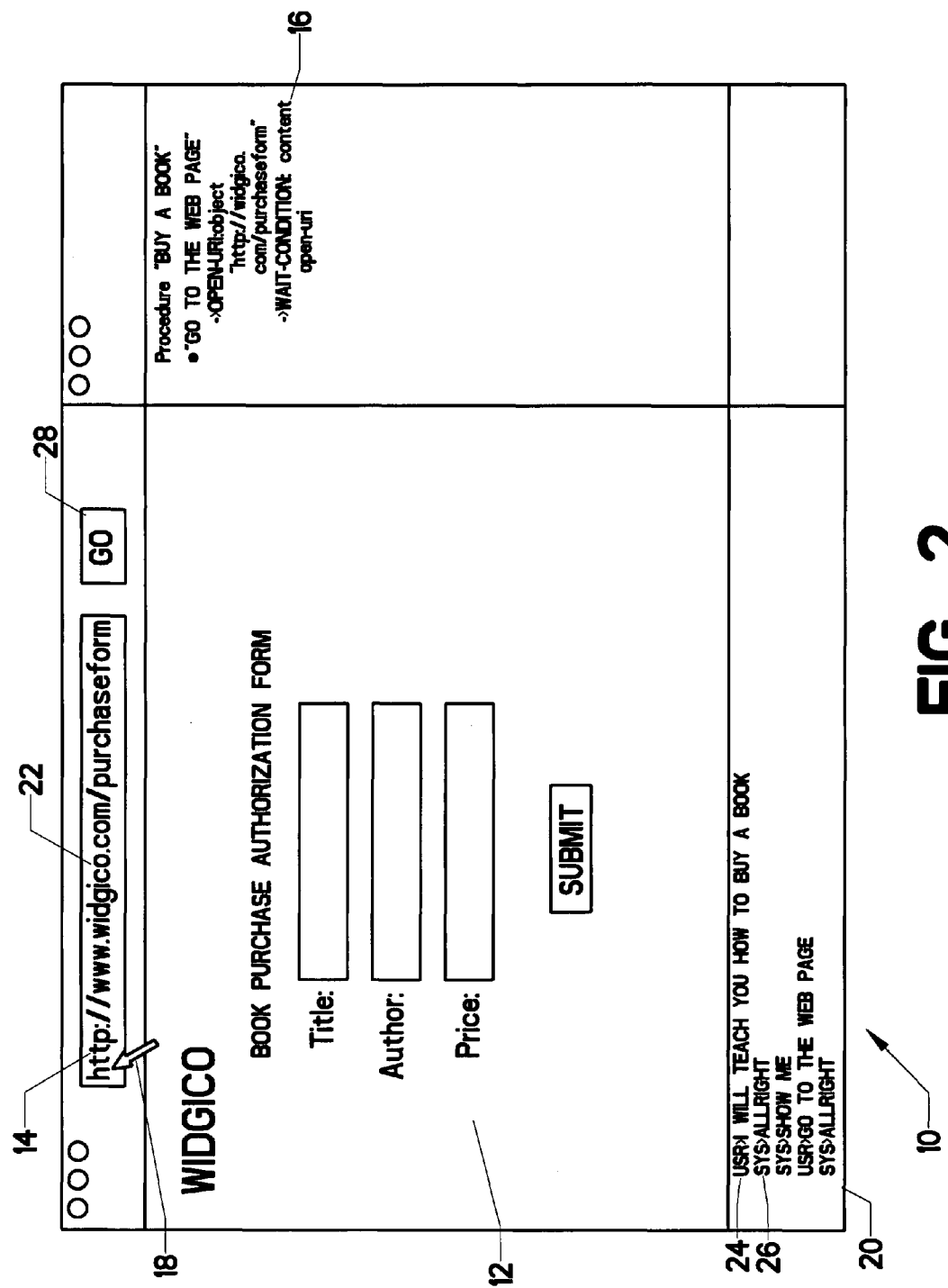
FIG. 2 shows the graphical user interface of FIG. 1, with an exemplary website being opened.
Figure 3:
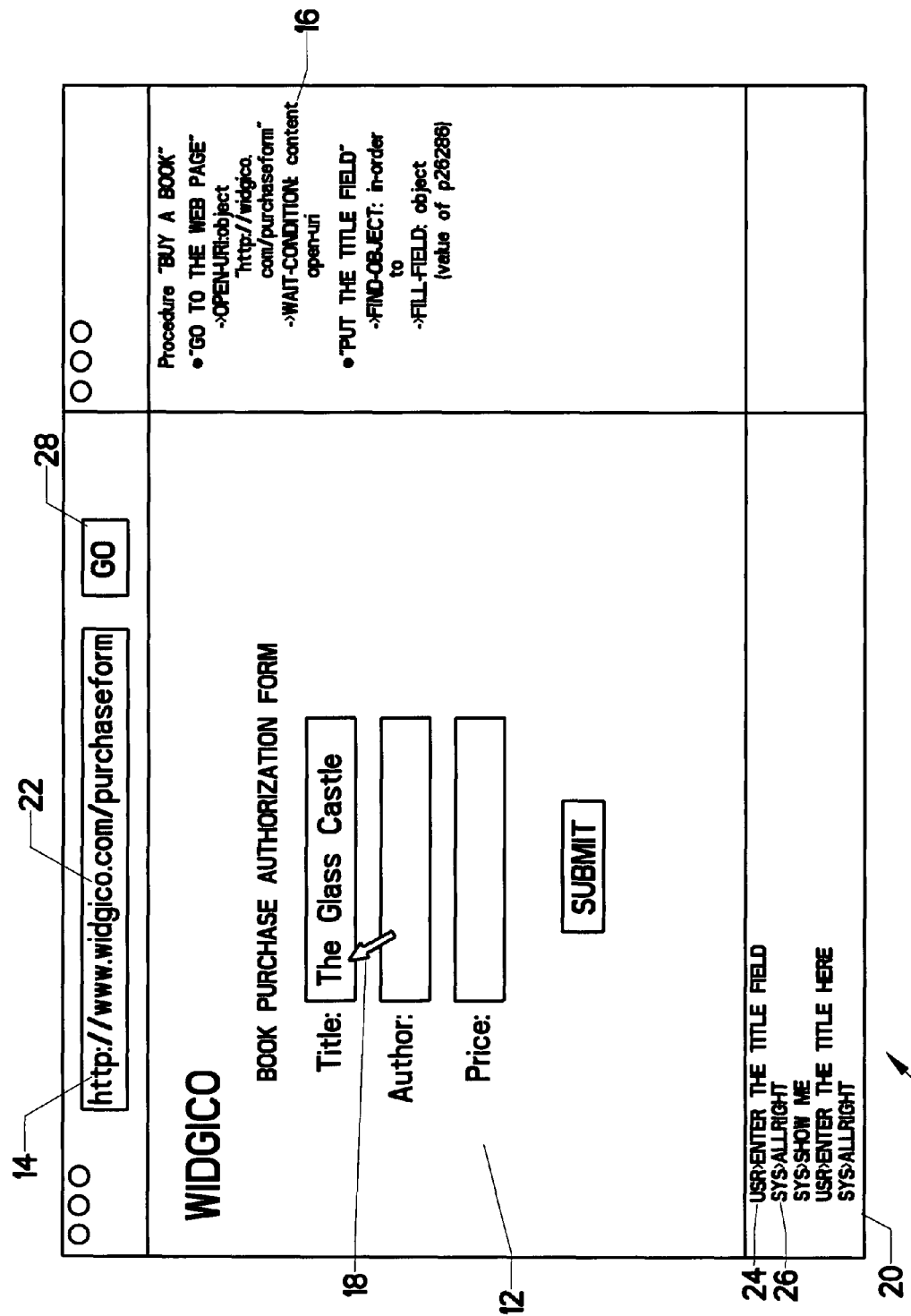
FIG. 3 shows the graphical user interface of FIG. 1, after the user has entered some information to be transmitted back to the host-server.

PLOW is capable of learning and thereafter repeating many types of repetitive tasks. It is particularly well-suited to carrying out tasks conducted over the Internet. FIGS. 2 and 3 illustrate how PLOW can learn to order a book. The user's computer is equipped with a microphone to receive the user's speech. PLOW used a language recognition software module to decipher the sounds created by the user and transform them into text which can be understood (The system also allows the user to simply type words using a keyboard or similar input device. However, speech recognition is preferred for its convenience). In this example, the user might speak the sentence "I will teach you how to buy a book." The language understanding module deciphers the spoken sounds and presents them as user speech 24 in speech interface display 20 (If the user elects to type in the words, these will also appear in the speech interface display). The system displays the message "USR>I WILL TEACH YOU HOW TO BUY A BOOK." The label "USR>" indicates that this is the speech uttered by the user, as understood by the software. In this instance, the user can see that the speech was understood correctly.

PLOW provides responsive statements back to the user, which help to indicate whether the system has understood the user's intent. PLOW's responses are presented as spoken words, using a voice synthesizer. In this example, PLOW responds by saying "Allright. Show me." The response is also shown as text in speech interface display 20 (shown in FIG. 2). System speech 26 appears as "SYS> ALLRIGHT SYS> SHOW ME." The label "SYS>" indicated that this speech was uttered by the computer. The text in speech interface display 20 preferably scrolls as additional lines are added. The user can thereby readily see the most recent exchanges.

PLOW's language understanding module does more than simply translate speech into written words, however. It is also able to understand sentence structures, so that it can ultimately determine the user's intent (These processes will be explained in more detail subsequently). Following receiving the initial statement from the user, PLOW creates a title for the new process it is about to learn and displays the title in task log 16. The task is presented in the text "Procedure 'BUY A BOOK'." The reader can thereby monitor whether PLOW has correctly understood the present objective. In the event of an error, corrective procedures are provided.

The user next speaks the phrase "Go to this web page." PLOW then displays the message "USR>GO TO THE WEB PAGE" in speech interface display 20. PLOW analyzes the speech and recognizes it as a step in the procedure it is currently learning. However, in this example, PLOW has no previously-learned information indicating which web page is intended. Thus, PLOW seeks further input by saying "Allright. Show me."

Now the user demonstrates an action rather than speaking. In FIG. 3, the user moves a computer mouse so that movable cursor 18 moves up to URI entry box 14. The user then types user-typed input 22 using a keyboard to identify the Uniform Resource Identifier ("URI") defining the desired website. In this example, the user types in "http://www.widgico.com/purchaseform." The user then presses transmit button 28, which causes the web browser to "navigate" to the URI.

PLOW monitors the users actions and stores them. PLOW "understands" that the typed URI identifies the appropriate website. The system presents the steps in task log 16. The step is presented as "OPEN-URI: object "http://www.widgico.com/purchaseform." The step is stored by PLOW as a series of actions, so that when it is later asked to carry out the process on its own, the system will execute the same actions.

PLOW contains knowledge as to which executed steps may incur a delay. As an example, the loading of a web page may take several seconds. Accordingly, the system inserts a "wait condition." This appears in task log 16 as "WAIT CONDITION: content open-uri."

Once the transmission from the host-server located at www.widgico.com is complete, a web page display is presented in browser display 12. In this particular example, a book purchase form is presented. PLOW anticipates further input from the user at this point, and may prompt the user if no further input is forthcoming. The user utters the statement "Enter the title field," which appears as deciphered text in speech interface display 20. PLOW then responds by issuing the voice-synthesized statement "All right. Show me." The user moves movable cursor 18 to title entry box 30, while uttering the instruction "Enter the title here." The system responds by saying "All right." This indicates that PLOW has understood the last instruction and has recorded the necessary steps. The user then types the desired book title ("The Glass Castle") into title entry box 30. Task log 16 is updated with a new step and the procedures defining the step. It displays:

---
"PUT THE TITLE FIELD"
   ->FIND-OBJECT:in-order-to
   ->FILL-FIELD: object (value of p26286)

---

PLOW has observed the user's demonstration as to the title entry box location, and has observed the necessity for entering a title in the entry box. The teaching process continues forward from this point, with the instructor "teaching" the PLOW software how to finish ordering the book (such as by selecting among books responsive to the title search, entering shipping information, and entering payment information).

Now that the user has obtained a basic understanding of the system's user interface, a detailed explanation of the system's architecture and operation is possible. The detailed explanation of the book ordering example will be continued once the broader concepts are explained.

PLOW is implemented via software running on a computational device. The system communicates with a user in natural dialog-based language. For each step a user teaches the system, the system attempts to recognize the user's intent. The system then learns to automatically execute steps by observing the user's actions and analyzing the verbal instructions the user provides.

PLOW creates an ontology of tasks. Those skilled in the art will know that an "ontology" in this context is a data model which represents a set of concepts within a domain and the relationships between those concepts. It is used to allow the software to "reason," meaning that the software can be programmed to anticipate that a specific object will have certain characteristics based on its nature. As one example, the system can anticipate that a book will have an author and a title. The system can also be programmed to predict how different objects are likely to interact.

The system creates and continually expands a lexicon pertaining to each task, so that the system can learn new words and define relationships between those words and words it already knows. Natural language grammars are also created, which comprise sets of rules describing how words interact with each other. Natural language sentences obtained from the user are thereby mapped to the task-specific ontology.

Figure 4:
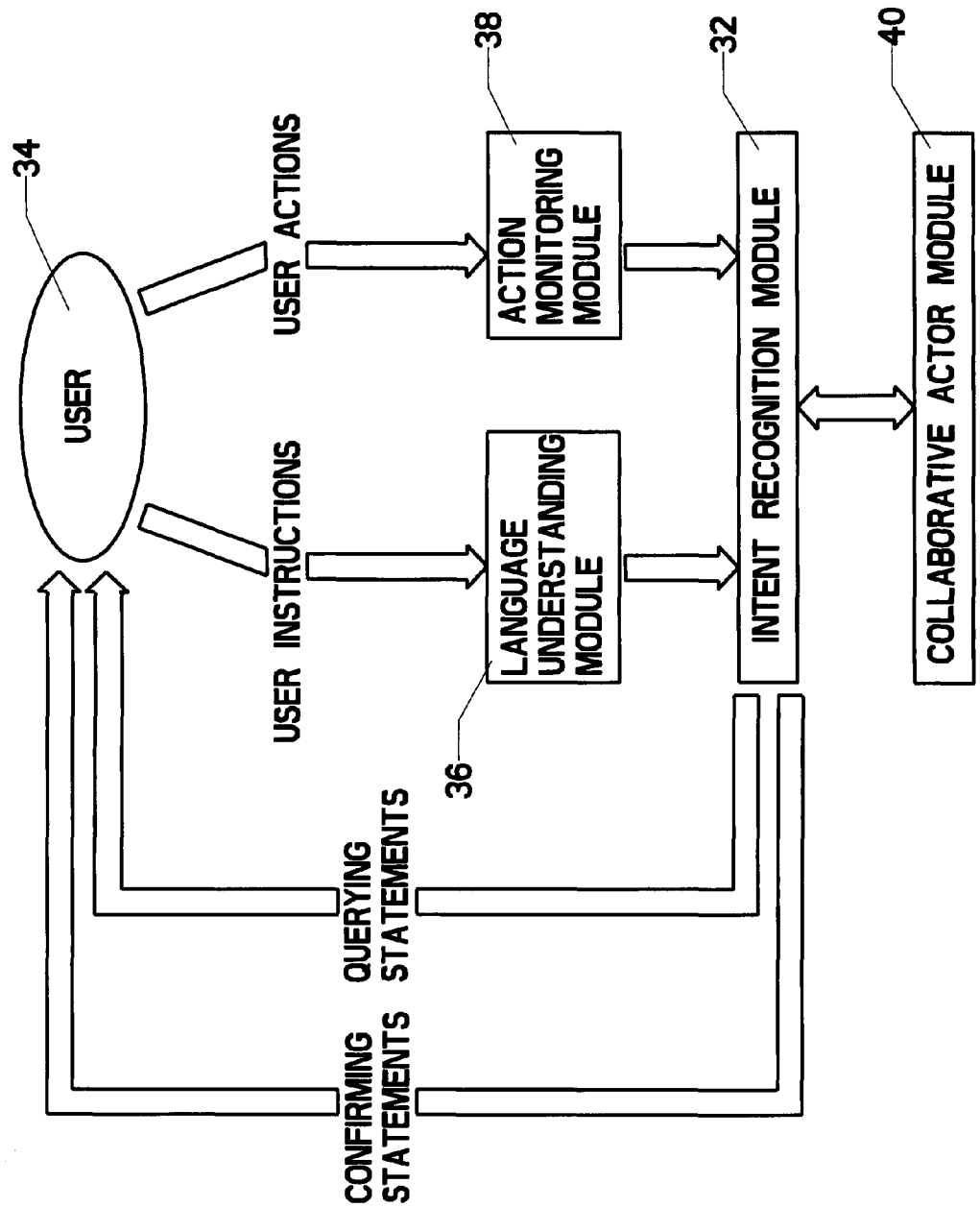
FIG. 4 is a schematic view, illustrating how the intent recognition component interacts with the user.

PLOW's ability to interact using conventional speech and demonstrated actions is an important feature. FIG. 4 is a schematic view showing how the system interacts with a user. As will be familiar to those skilled in the art, the term "module" is used to describe various subsytems operating within the PLOW software. User 34 provides teaching input via spoken user instructions (such as "Put the title here") and demonstrated user actions (such as moving a mouse and actuating it within a text entry box). The spoken instructions are received by language understanding module 36, which translates the spoken words into written text. The written text is then received by intent recognition module 32.

The demonstrated user actions are tracked by action monitoring module 38. It can monitor many actions, including a pointing device location and mouse button "clicks." As an example, it can note the fact that the user has selected a particular link within an open web page. Action monitoring module 38 transmits information regarding demonstrated user actions to intent recognition module 32.

Intent recognition module 32 attempts to discern the user's intent. It also interacts with the user to clarify the user's intent. If, as an example, the user utters the statement "Put the title here," the intent recognition module will expect a demonstrated action to follow. If it does not receive a demonstrated action, it will transmit a prompting statement back to the user (such as "show me where").

If, on the other hand, the intent recognition module receives an expected input (such as the user moving the mouse to a text input box, selecting the input box, and typing in a title), the intent recognition module can transmit a confirming statement, such as "OK. I understand." Statements transmitted from intent recognition module 32 to the user are preferably transmitted as synthesized human speech. However, they could also be transmitted as written text on a computer monitor.

Some other examples of the operation of the intent recognition module may be helpful. If the user issues the instruction "Let me teach you how to buy a book," the intent recognition module discerns the intent (the start of task learning) and the description of the new task ("BUY A BOOK"). The task description is internally stored in a machine-readable format such as "((relation v1:instance-of buy:object v2) (a v2:instance-ofbook))." As described previously with respect to FIG. 2, PLOW places its interpretation of the new task's name in task log 16. The reader will note that the output phrase ("BUY A BOOK") is not a result of speech recognition, but rather an independently generated phrase reflecting the system's understanding of the user's intent.

The task log provides feedback allowing the user to monitor the system's understanding. If the system misinterpreted the spoken words as "Let me teach you how to buy a box," then the task log would read "BUY A BOX." The user could then take corrective action. As an example, the user could utter the phrase "That is incorrect." The intent recognition module would then issue a querying statement such as "I do not understand. Please repeat your first instruction."

Given the user utterance "Go to this web page," the intent recognition module understands that the user is attempting to add a step into the task currently being learned. PLOW will attempt to verify whether the proposed step makes sense in the context of the current task. For instance, if the user utters the phrase "move to this place," the intent recognition module will understand that such a command has no clear meaning in the context of web interactions. The system will then signal an error, by saying "I don't understand."

Figure 5:
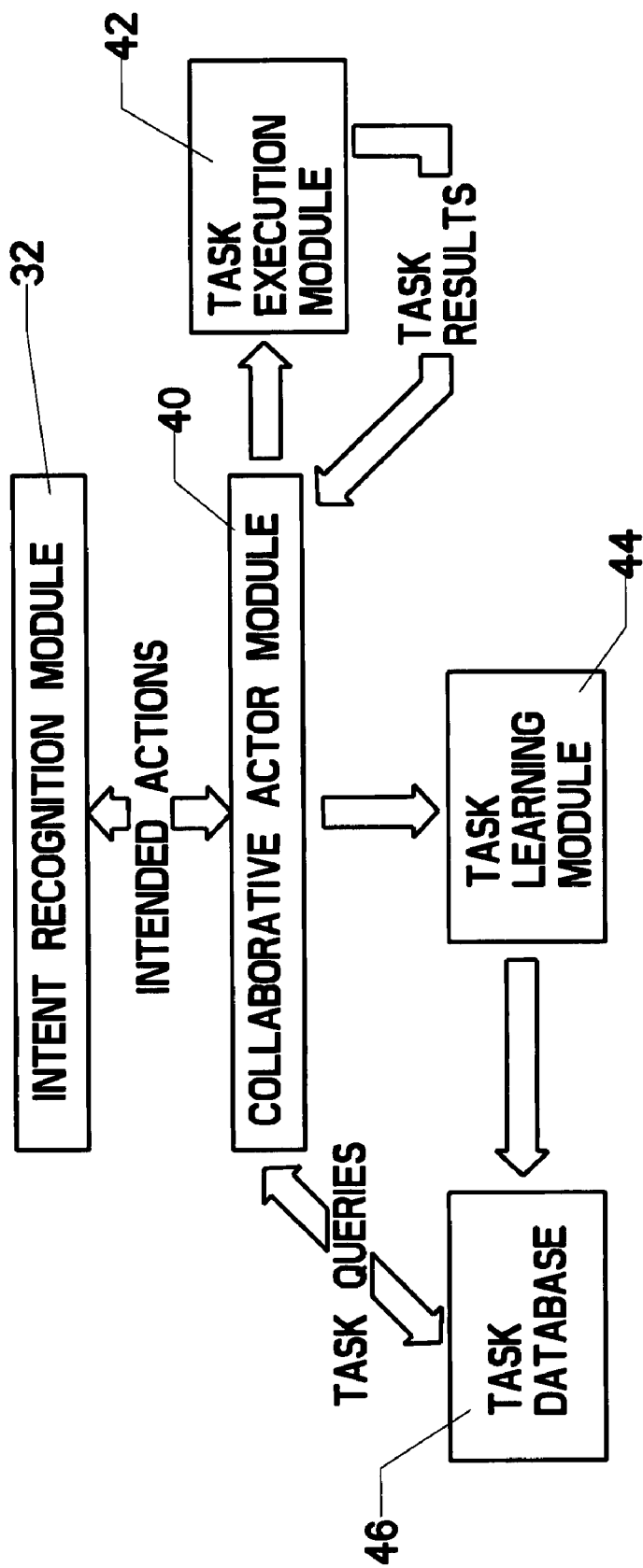
FIG. 5 is a schematic view, illustrating the overall architecture of the present invention.

FIG. 5 shows the PLOW system's overall architecture. Intent recognition module 32 interacts with the user, as described previously. Once it confirms the user's intent, it transmits that intent to collaborative actor module 40. As an example, the intent recognition module may discern the intent to add a new step to the process of buying a book, such as going to a particular web page. The intent recognition module then transmits this information to collaborative actor module 40. The collaborative actor module recognizes that a new step is desired, but that no definition has yet been provided for the new step. The collaborative actor module then sends a request to task learning module 44, requesting to add a demonstrated action to define the current step. Task learning module 44 checks to see if the proposed action (opening a URI) is a valid action for the browser navigation step. If it is valid, task learning module 44 adds the new task to task database 46. Once the definition of the new step is deemed valid and opened, the system monitors the user's actions and records them in the task database.

The system identifies "objects" that a user interacts with (with the term "objects" being understood to mean virtual objects in the context of computer operations) and observes what the user does with them. An explanation of the identification process may be helpful. Returning to FIG. 3, the reader will recall that the user identified title location box 30 and entered a title therein. In the world of HTML, title entry box 30 is considered part of a form. The code transmitted from the host-server to create this form might look like:

```
<p class="legend">BOOK PURCHASE AUTHORIZATION FORM</p>
<label>Title:</label><input type="text" name=title size="30"/><br />
<label>Author:</label><input type="text" name=author size="30"/><br />
<label>Price:</label><input type="text" name=price size="30"/><br />
<label>Submitted By:</label><input type="text" name=submittor size="30"/><br />
```

This code will create the form shown in browser display 12 in FIG. 2. The system then "observes" that the user has moved movable cursor 18 to the location of the "Title" input variable, and that the user has typed information to create a value for the variable "title" as defined in the code. The system then understands the step of filling in the title as more than simply mimicking the user's actions. It "knows" that the step of filling in the title means reviewing the code transmitted by the host-server and searching for an object having the name "title," and then inputting text for that object. This distinction provides much more flexibility. If, for example, the "WIDGICO" website is updated and the input format changes, PLOW will still know to search the new website code for an object having the name "title" and to provide the appropriate text input. Thus, where a conventional macro would be defeated by the update to the website, PLOW will continue functioning.

Another good example involves the use of "links" on a website. A user-selectable link is used to open a new web page (sometimes within the same "base" URI and sometimes at a completely different location). A variety of objects are used to signify a link. On the client-user's computer, these may appear as "buttons" naming another site, pictures, graphical icons, or an express recitation of another URI. Code transmitted from a host-server (In this fictitious example, a host-server residing at www.magnetinfo.edu) might include the following lines:

```
<p>Neodymium magnets are generally considered the strongest permanent magnets. Many different sizes are available from
<a href="http://www.widgico.com/products/magnets"> Widgico,</a>.
High temperature grades are available at an additional cost from <a href="http://www.magnatemp.com/consumerproducts/magnet/hightemp"> Magnatemp,</a>.
```

This would be displayed as text having two embedded links—one to the widgico.com website and one to the magnetemp.com website. If the user is demonstrating ordering a magnet, PLOW would note that the user opened a first website (www.magnetinfo.edu), then actuated a link opening a second website (www.widigico.com/products/magnets). PLOW then learns the step as actuating an object (the link). If the "magnetinfo.edu" website subsequently changes, PLOW will still know to look for the link and will actuate the link in carrying out the task it learns.

PLOW's capability goes further. As an example, many websites use photographs or graphical icons to create a link. If the magnetinfo.edu site used such a link, the code transmitted from the host-server might look like:

```
<a href="http://www.widgico.com/products/magnets">
"title="Magnet Experiment Pack"><img
src=http://www.widgico.com/products/magnets/images/41/
Magexpk_11.jpg"width="240" height="180" /></a></p>
```

This would display a photographic image of Widgico's "magnet experiment pack." If the user selects the image, then the link will be actuated and the specified page on www.widgico.com will be opened. PLOW would again "learn" that this step in the process is the step of moving to the appropriate page on the widgico.com website. If the magnetinof.edu website then changed to eliminate the image link and instead placed a text link somewhere else on the page, PLOW would still "understand" the need to actuate the text link (even though to the user the link would have substantially altered its form).

Even more is sophistication is possible within the PLOWS system. HTML code will cause the display of words that are visible on the client-user's monitor. Of course, many other non-displayed items are also present. PLOW uses all the code (displayed and non-displayed portions) in learning a step in a task. It accomplishes this task by using two resources: semantic ontology and a word lexicon. When the user utters words describing an action ("Let me teach you how to buy a book"), PLOW translates the words into ontological concepts (Action: BUY; Object: BOOK). The system then uses these ontological concepts to look up all possible synonyms in the lexicon. The lexicon is preferably broader than a conventional thesaurus, since it is important to link related concepts beyond simply providing equivalent words.

In this example, the lexicon might return the following synonyms: BUY—purchase, procure, obtain, acquire; BOOK—novel, reference, manual, biography, treatise, etc. PLOW then searches the HTML structure for relations to the words it has retrieved from the lexicon. PLOW searches the structure of an object itself (such as an input field for the title of a book) and also searches the surrounding neighbors of the object (such as a label). An example will illustrate the utility of this approach.

Figure 6:
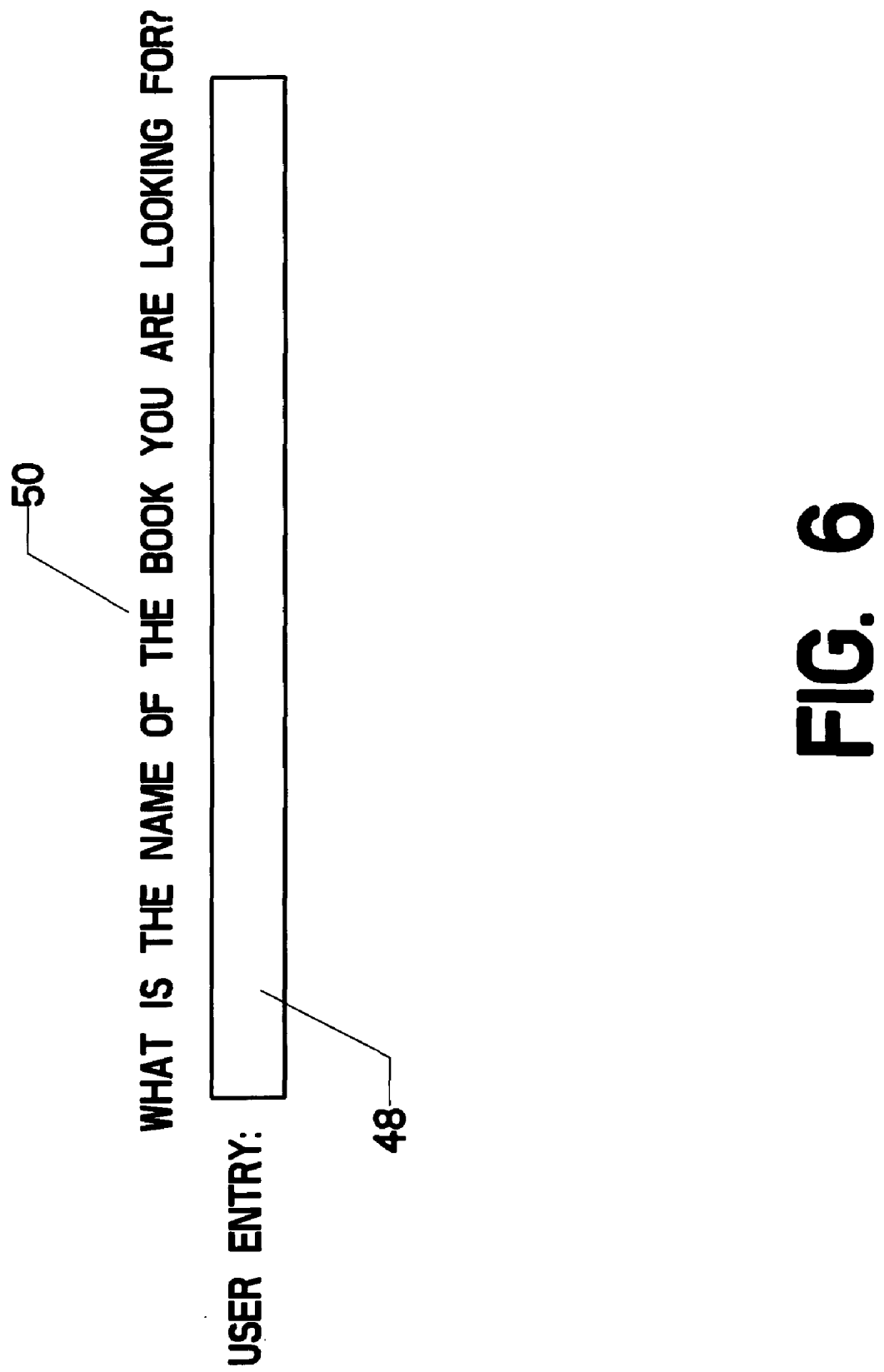
FIG. 6 is a depiction of a graphical user interface, showing a text entry box.

FIG. 6 shows a display of a simplified form on a client-user's monitor after receiving HTML code transmitted by a host-server. The code used to create this display might look like:

```
<p class="legend">WHAT IS THE NAME OF THE BOOK YOU ARE LOOKING FOR?</p>
<label>User Entry:</label><input type="text" name=bt004 size="30"/><br />
```

The HTML code uses an object named "bt004" to receive the text input corresponding to the title of the book. In observing the user's actions in teaching the step, PLOW notes that the user has provided text input which will be returned to the host-server as a definition of the variable "bt004." Because PLOW received an oral instruction from the user ("Put the title here"), the system understands that the text object refers to the title of a book. This connection is made, even though the object name "bt004" has no meaning to the user or to PLOW.

However, PLOW also searches the neighboring code and searches its own lexicon. In so doing, PLOW identifies the word "name" as a likely equivalent of the concept "title" in this context. PLOW then learns that the text variable requiring an input should be adjacent to the message "WHAT IS THE NAME OF THE BOOK YOU ARE LOOKING FOR?" If the host-server later changes the variable name to "bt005" (the last line might change to read "name=bt005 size="30"/><br/>) then PLOW will enter the book title as a definition for the variable "bt005" and return that value to the host-server.

Thus, the reader will understand that the system generalizes knowledge obtained from the user to identify code "objects." The examples provided have been in the context of HTML web code, but the system can be adapted to function in virtually any computing environment. When a connection between a user's utterance and the code is made, the system remembers where in the object structure the connection was found, and stores this as learned knowledge in the task database. By creating this "intelligent" link, the system can find the object again even if the code changes (which is particularly true of the HTML environment).

Those skilled in the art will know that an application-specific version of the inventive process would likely not have the benefit of open source code. As an example, if the system is to operate within a spreadsheet environment, those persons creating the code to implement the inventive system would need to be given access to the spreadsheet's source code (which would traditionally not be available to an end-user). With access to the source code, the inventive process could be interfaced with the source code. The functionality of the inventive process would then be the same as in the prior exemplary descriptions.

Returning now to the web environment examples, PLOW is even capable of expanding upon what it has learned to find different objects which the user never taught. As an example, if a user teaches the system how to find a "Books" tab on a given website, the HTML structure is parameterized where the "Books" link is found. If the user subsequently utters the phrase "Select the 'Movies' tab," the system uses the parameterized structure to search for a "Movies" tab link and selects it. Of course, this type of inferential expansion is not foolproof. But, if PLOW is unable to comply with the request given its existing task database, the system will ask for help. The user will then know that additional instructions or demonstrations are needed. As a generality, however, the system will become more flexible and adaptive as it stores more tasks in the task database. In this sense it is similar to human learning.

The system also creates a task hierarchy. The intent recognition module recognizes user utterances which introduce another step or sub-task. When such a cue is detected, collaborative actor module 40 will create a new sub task in the task database. Significantly, this will be stored independently and may be used separately in a different process. If, as an example, the subtask is creating an ordering of search results based on date of publication, the date-ordering sub task can be used in a completely unrelated process (such as a requested date ordering of a group of word processing files on the user's computer).

The system recognizes the end of a subtask by recognizing the intent of the user utterances (such as "I'm done"). When a sub task is complete, if the parent task remains incomplete, subsequent steps are added to the parent task. Monitoring the user utterances indicating the start and finish of each task allows the system to learn task segmentation even with only a single demonstration.

PLOW identifies the task input parameters. The system uses three sources to identify the needed parameters: First, it uses the initial task definition of buying a book. The system identifies the object of the exercise as a "book." The system next identifies ontological properties of a "book" (such as title and author). Second, the system identifies parameters by observing which user actions require the inputting of text (such as "Put the title here"). The "title" is thereby recognized as an input parameter. Third, the system identifies input parameters by recognizing user statements which require one (such as "Get an ISBN").

The system also has the ability to distinguish static parameters from a variable input parameter. For instance, if the user utters the phrase "Put hotel here" and then types "hotel" into an entry box on an HTML form (such as a place name field in a MAPQUEST.COM form) the system interprets this as the user intending that the word "hotel" always be placed in the form rather than the name of a specific hotel (such as "Hampton Inn"). The system makes this inference by noting that the uttered word "hotel" is identical or very similar to the characters that were actually typed. If, on the other hand, the user uttered the phrase "Put hotel here" and then typed the characters "Hampton Inn," the system would understand that the phrase "hotel" indicates an input variable that must be changeable each time the task is executed.

The system also checks to see whether a user utterance references a potential input parameter which has already been defined in a previous step. For instance, if a step of extracting the price of a book from a vendor web page has already been executed, and the user then utters the phrase "Put the price here," the system will not define a new input variable but will instead place the previously-obtained value where the user has directed.

PLOW can also identify the dependencies of the objects in a task it is creating. The connections between the objects are discerned from the user utterances. The user's utterance of definite articles is particularly important. If the user says "Put a title here," the system will define that as a new variable ("title") which requires a subsequent input. If, on the other hand, the user says "Put the title here," the system will search the prior steps to see if a value for "title" has already been obtained. The system then "knows" that it does not need to define a new input variable but should instead perform a step using a previously obtained input variable.

Having now reviewed how the system operates, the reader's attention is again directed to the operational example commencing in FIGS. 2 and 3. The reader will recall that the user is teaching the system how to buy a book. In FIG. 3, the user had instructed the system to "Enter the title here" (referring to a book title to be entered in title entry box 30). Task log 16 shows this step as "PUT THE TITLE FIELD." However, rather than simply duplicating the steps the user has demonstrated, PLOW creates another intervening step. The user will note in the task log that PLOW has created the step "FIND-OBJECT: **\*\*_____\*\***. In this inserted step, the system will utilize the processes previously described to search the HTML code and identify the text object corresponding to the book's title. The name of this object may be the same as when the task was first taught. However, if it has changed, the system will likely identify the new name. The system then submits the title as entered by the user.

Figure 7:
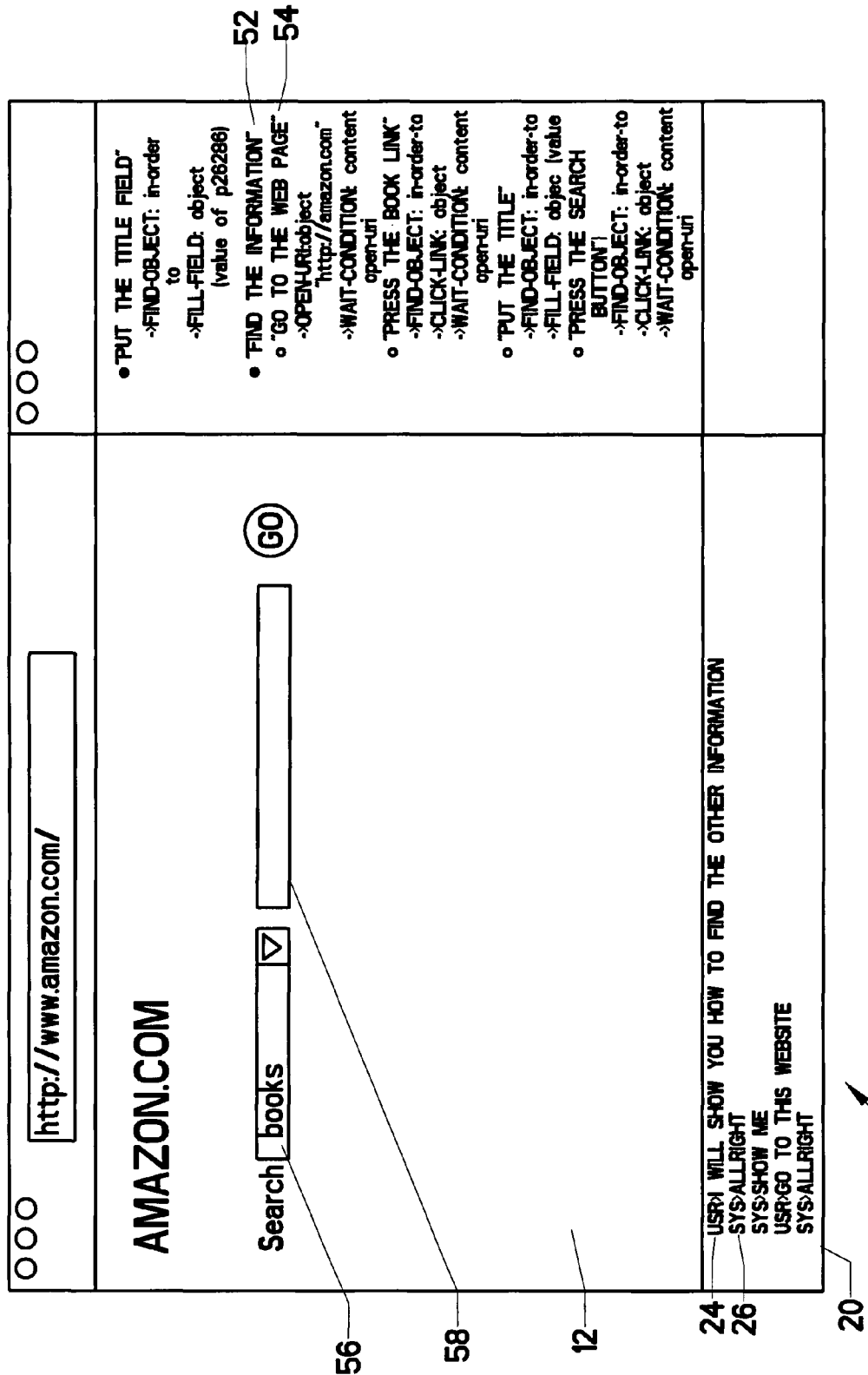
FIG. 7 shows the graphical user interface of FIG. 1, with an exemplary website being opened.

The user has entered a book title into the "Widgico" book purchase authorization form. However, the form requests other information—such as a price. The user then utters the statement: "I will show you how to find the other information." The user then demonstrates how to navigate to an online vendor site. FIG. 7 shows the process continued. Browser display 12 shows the "AMAZON.COM" website (For purposes of visual clarity, it is shown in simplified form). The task log shows the identification of the new step of "finding the other information" (shown as task label 52). The task log also shows the identification of a new sub-task of going to a new website (shown as sub-task label 54).

The user then demonstrates pulling down and selecting the "Books" category in search category box 56. The user next utters the phrase "Put the title here" and demonstrates picking text entry box 58. The system will infer from the use of the definite article "the" that the previously entered title ("The Glass Castle" entered in FIG. 3) should be placed in the text entry box. If the system's inference is incorrect, the user can correct the mistake. The user then instructs PLOW to actuate the "GO" button to launch the search.

Figure 8:
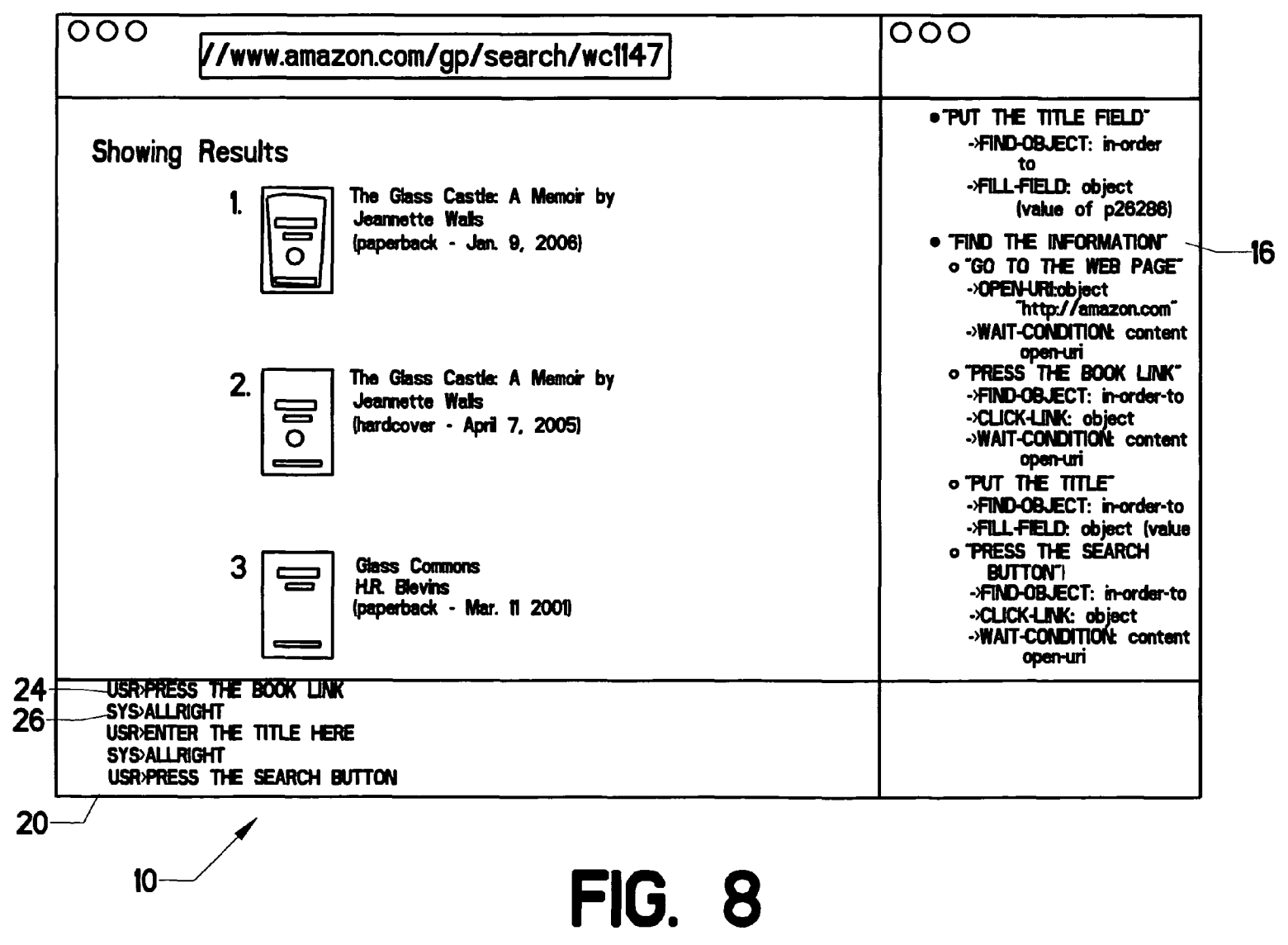

FIG. 8 is a simplified depiction of a search results page in browser display 12. Search result display 60 includes a list of image links 62 (each showing the cover of a book) and associated text links 64. If the user selects one of the image links, the system will scan the HTML code and note the fact that the immediately adjoining text link opens the same page. The two links will then be recorded as equivalents. If when the system opens a similar results page in the future, it cannot find the graphical link, it will know to select the equivalent text link.

Proceeding with the example, the user would then teach the system to open a specific book page and identify the price. The price would then be stored and entered back on the book purchase form shown in FIGS. 2 and 3. The "BUY A BOOK" procedure can continue through providing payment and shipping information.

Once the complete task is learned, the user can employ PLOW's task database the next time he or she wishes to order a book. The user would only need to say something like "I want to buy a book." The system would then ask, "What is the title of the book?" Once that information is provided, PLOW would then perform the steps it was previously taught and complete the transaction. Of course, the user can build in "authorization" steps. As an example, the user could teach the system to obtain price and delivery date information, then provide this information back to the user and ask whether the user wishes to complete the transaction.

Figure 9:
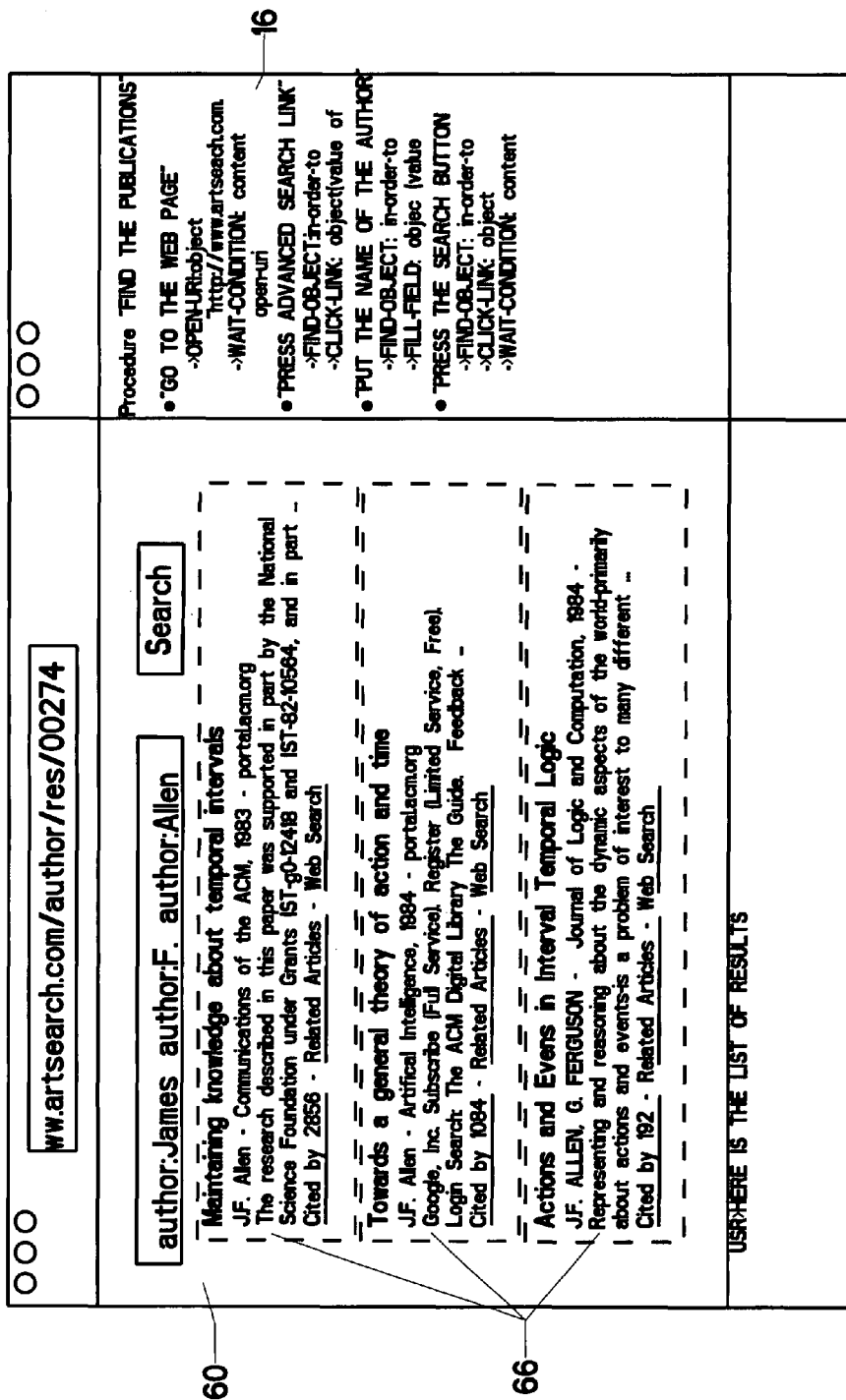
FIG. 9 shows another exemplary website and a search result.

Another example serves to illustrate how the system identifies iterative tasks. Many websites display search results as an ordered list. FIG. 9 shows such a result. A search is conducted for publications listing "James F. Allen" as an author. Search result display 60 shows such an ordered list. The user at this point says "Here is the list of results." The ontology of this statement allows PLOW to recognize the presence of iteration and the type of object to iterate over (a list). The task learning module creates a subtask within the steps following the recognition of iteration until such time as the user defines the end of iteration. During the existence of the iteration, any subtask created will be applied to each list item.

Most search engines create lists consisting of multiple DOM (Document Object Model) nodes in a hierarchy. PLOW preferably provides a system to assist the user in identifying each DOM. One good method is to allow the user to select a key (typically the "Alt") key and then make multiple clicks or mouse movements within a DOM node until the whole DOM node is highlighted. The user then utters a statement such as "This is one complete result." PLOW then applies what is has learned and identifies all the remaining DOM nodes.

Figure 10:
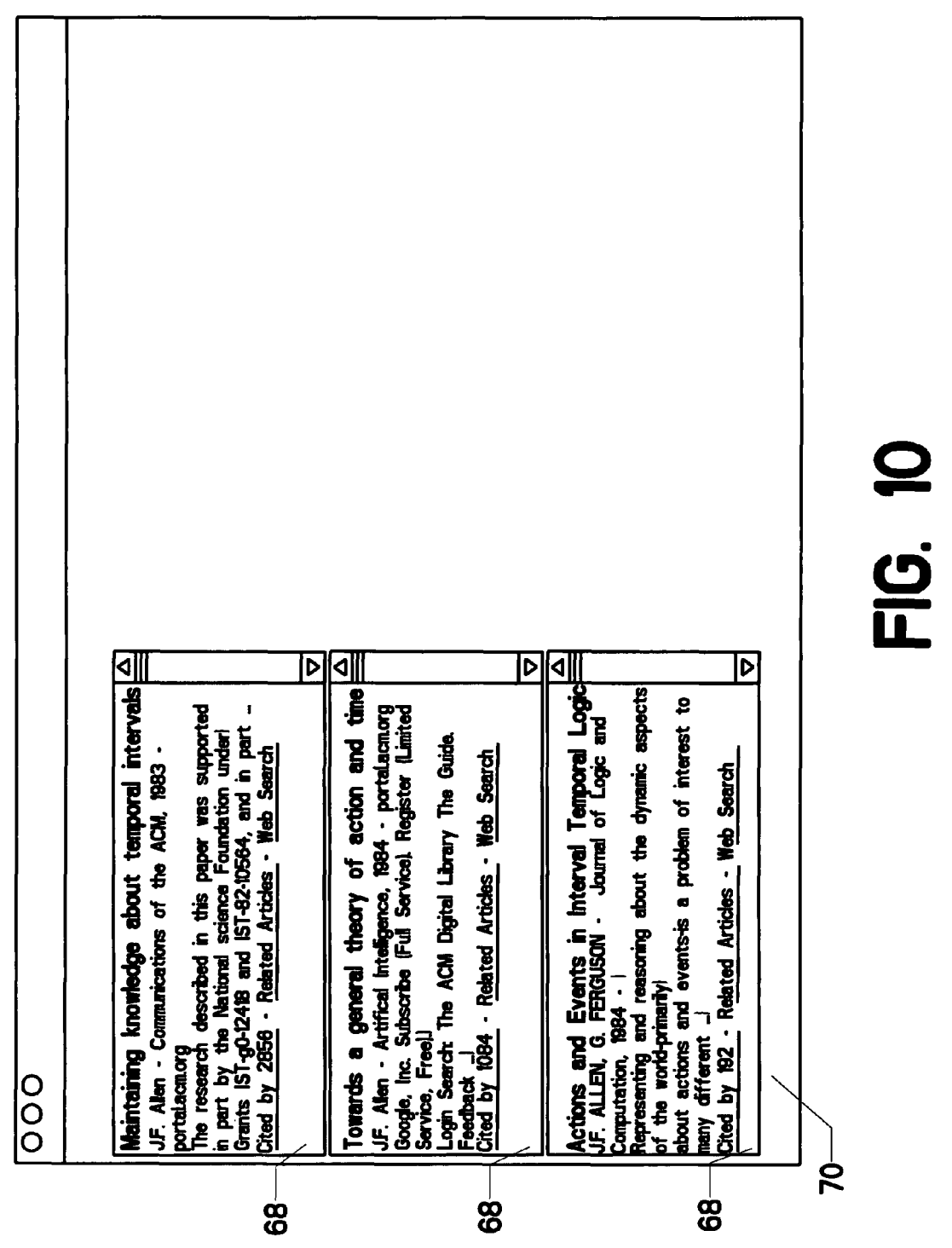

Once the system understands that an iterative task is appropriate—and the nature of the iteration—it preferably takes the initiative and displays an alternate GUI which graphically depicts the iteration. FIG. 10 shows a depiction of what this GUI might look like. Each demarcated DOM node 68 is displayed in its own cell. Thereafter, when a user demonstrates a task to be applied to one cell, the system will automatically apply that task to all cells. As an example, if the user says "This is the title" while demonstrating the title in the first cell, the system will analyze all the cells and attempt to identify the title. Of course, this process is actually performed by analyzing the HTML or comparable code. The code used to create the first three entries might look like (with annotations added in italics contained in brackets):

```
[First Entry]
onmousedown="new
Image( ).src='/scholar_url?sa=T&url=http://portal.acm.org/citation.cfm%3Fid%3D358
434%26dl%3DACM%26coll%3Dportal';">Maintaining knowledge about temporal
intervals</a></span>-<a
class=fl href="/scholar?hl=en&lr=&cluster=9444663091616816328">group of 3
»</a><font size=-1><br><span class="a">JF <b>Allen</b> - Communications
of the ACM, 1983 - portal.acm.org</span><br>The research described in this paper
was supported in part by the National <br>
Science Foundation under Grants IST-g0-12418 and IST-82-10564. and in part <b>
...</b>
<br><a class=fl href="/scholar?hl=en&lr=&cites=9444663091616816328">Cited by
2951</a>-<a
class=fl
href="/scholar?hl=en&lr=&q=related:yBwQtwovEoMJ:scholar.google.com/">Related
Articles</a>-<a
class=fl
href="http://www.google.com/search?hl=en&lr=&q=%22Allen%22+%22Maintaining
+knowledge+*+temporal%22">Web Search</a></font>   <p class=g><span
class="w"><a href="http://portal.acm.org/citation.cfm?id=1065&dl="
[End of First Entry]
[Start of Second Entry]
onmousedown="new
Image( ).src='/scholar_url?sa=T&url=http://portal.acm.org/citation.cfm%3Fid%3D106
5%26dl%3D';">Towards a general theory of action and time</a></span> - <a class=fl
href="/scholar?hl=en&lr=&cluster=3309208602015743024">group   of   3
»</a><font size=-1><br><span class="a">JF <b>Allen</b> - Artificial
Intelligence, 1984 - portal.acm.org</span><br>Google, Inc. Subscribe (Full Service),
Register (Limited Service, Free),<br>
Login. Search: The ACM Digital Library The Guide. Feedback <b>...</b>
<br><a class=fl href="/scholar?hl=en&lr=&cites=3309208602015743024">Cited by
1126</a>          -             <a        class=fl
href="/scholar?hl=en&lr=&q=related:MLzQyrCr7C0J:scholar.google.com/">Related
Articles</a>           -             <a        class=fl
href="http://www.google.com/search?hl=en&lr=&q=%22Allen%22+%22Towards+*
+general+theory%22">Web Search</a></font> <p class=g><span class="w"><a
href="http://stinet.dtic.mil/oai/oai?&verb=getRecord&metadataPrefix=html
&identifier=ADA150832"
[End of Second Entry]
[Start of Third Entry]
onmousedown="new
Image( ).src='/scholar_url?sa=T&url=http://stinet.dtic.mil/oai/oai%3F%26verb%3Dget
Record%26metadataPrefix%3Dhtml%26identifier%3DADA150832';">A      Plan
Recognition Model for Subdialogues in Conversations</a></span> - <a class=fl
href="/scholar?hl=en&lr=&cluster=2505121194390296033">group    of    2
»</a><font size=-1><br><span class="a">DJ Litman, JF <b>Allen</b> -
Cognitive Science, 1987 - stinet.dtic.mil</span><br>Abstract : Task-oriented
dialogues occur when two people work cooperatively on a <br>
task (eg, a plan) which is performed during the dialogue. One promising <b> ...</b>
<br><a class=fl href="/scholar?hl=en&lr=&cites=2505121194390296033">Cited by
250</a>             -                    <a         class=fl
href="/scholar?hl=en&lr=&q=related:4ZXvHnT6wyIJ:scholar.google.com/">Related
Articles</a>            -                    <a         class=fl
href="/scholar?hl=en&lr=&q=cache:4ZXvHnT6wyIJ:stinet.dtic.mil/oai/oai%3F%26verb
```

-continued

```
%3DgetRecord%26metadataPrefix%3Dhtml%26identifier%3DADA150832+author:
james+author:f.+author:allen">Cached</a>    -    <a    class=fl
href="http://www.google.com/search?hl=en&lr=&q=%22Litman%22+%22Plan+Recognition
+Model%22">Web    Search</a>    -    <a    class=fl
href="http://worldcat.org/wcpa/oclc/18606553"
[End of Third Entry]
```

The user then identifies the title in the first entry, and the system identifies the corresponding portion of the code, in this case ">Maintaining knowledge about temporal intervals<." The system preferably provides an enhanced GUI displaying iterative operations. The system then looks for code having a similar structure in all the other DOM nodes. It preferably displays the result in an alternate GUI.

FIG. 10 shows a simplified depiction of what this user interface might look like. The left column displays the search results returned in the search of FIG. 9 (multiple DOM nodes). For purposes of visual clarity, only three search results are shown. In actuality, many more search results could be shown on a single page.

Figure 11:
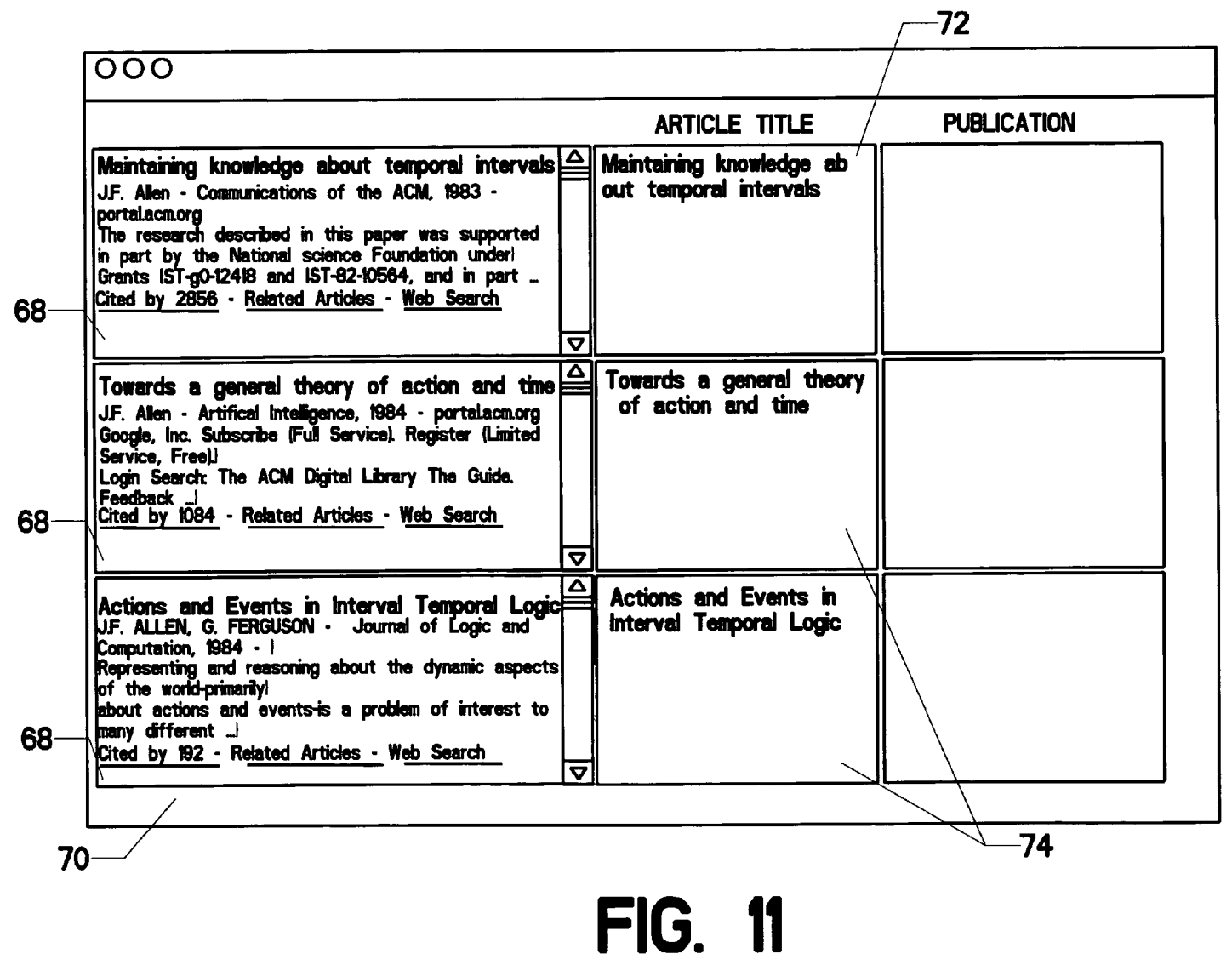

When the user identifies the title in the first result, the GUI creates a second column and labels it ("THE ARTICLE TITLE"). The title which was actually identified by the user then appears in the second column as demonstrated title 72 (shown in FIG. 11). The system then searches the remaining DOM nodes and—using what it has learned—attempts to extract the titles. The extracted titles are then placed into the second column as iterated titled 74.

The user can continue the process by identifying the publication in which the article appears. The system will then create a third column with an appropriate title (such as "THE PUBLICATION"). The system will automatically iterate through the DOM nodes. The extracted publication names will then appear in the third column. On some occasions the system will make mistakes. For example, it may extract the wrong structure as the title. If so, the user can readily observe the mistake and take action to correct it. The GUI allows the user to select a particular entry in the columns and then utter a statement such as "This is incorrect." PLOW responds by saying something like "All right. Show me the correct response." The user then goes into the DOM node in which the mistake was made and correctly highlights the title.

Correction can also be made by simply identifying another title in a DOM node. The system will then scan the titles it iteratively extracted. If its extracted title is not an exact match for the title demonstrated by the user, it will correct the mistake and also apply what it has learned to the other extracted titles (which may also need to be updated). The user can continue applying teaching actions until the parsing is all correct. Of course, the steps learned by the system will be stored in the task database. This information can then be used in parsing future lists.

The system uses a flexible approach to table parsing that compares HTML DOM objects for similarity. The reader should note that lists can assume many forms in HTML code, such as table rows (<tr>), ordered list items (<li>), or even a list of paragraphs (<p>). The parsing step described could be applied to any of these. Each object is compared to its neighbor and sorted into "similarity bins." Thus, the type of object is unimportant. The structure of the objects determines whether there is repetition indicating a list object.

The actual GUI used to facilitate this process can obviously assume many forms. However, the use of the approach shown in FIG. 10 is helpful since (1) It enables the user to easily spot mistakes; and (2) It allows the user to easily teach the system the important points since irrelevant information in the original webpage is filtered out.

Those skilled in the art will know that most search results obtained on the Web are presented as multiple pages with a list on each page. The user must take some action to index to the next list (usually choosing "Next"). The user can teach PLOW how to automate this process. The user utters a statement such as "Click Next to get more results." The system interprets the phrase " . . . get more results" as a cue that when the next list is retrieved from the host-server, the user intends to repeat the steps previously demonstrated on the initial list. Returning to the GUI shown in FIG. 10, the system will add more rows to each column as new list pages are reviewed.

The system preferably takes the initiative in determining when the retrieving of additional lists should be terminated. As an example, the system can ask "When should I stop searching?" The user can then provide a spoken answer using natural language. The system is preferably configured to recognize one or more of the following termination conditions: (1) maximum number of pages; (2) static or parameterized maximum number of results; and (3) propositions of numeric value comparison (less than, greater than, equal to, etc.).

The first two conditions are self-explanatory. The third termination condition may be best understood using an example: In this example, a user conducts a search on the website known as "MAPQUEST.COM." Specifically, the user searches for hotels which are near the address "1018 E. De Soto St. Pensacola, Fla. 32501-3362." The user naturally does this as part of teaching PLOW how to automate such a search for future use. By this point, the reader has a thorough understanding of how the user interacts with PLOW to open a new task and navigate to the appropriate website. Thus, only the new concepts will be described in detail. The reader can review what has been taught and learned in the task log shown on the right of FIG. 12.

The browser display on the left of FIG. 12 shows proximity search input 76 provided by the user and search results 78 provided by the website. The search results show hotels which are in close proximity to the address provided. The search results only show the first page. If the user utters a statement such as "Get more results," the system asks the user to define the termination condition. If the user wants to use a proposition of numeric comparison, he or she will say something like "when the distance is more than five miles."

PLOW understands this speech as defining a proposition of numeric comparison. In order to carry out the comparisons, the system needs to interpret text embedded in the search results. The HTML text producing the first two results might look like (with annotations shown in italics and superfluous materials omitted for clarity):

```
[Start of First Result]
<li id="mqresult-1" class="vcard"><b class="fn org">Residence Inn-
Pensacola Dwntwn</b><div class="adr"><span class="street-
address">601  E  Chase  St, Pensacola, FL</span><span
```

-continued

```
class="distance"> (0.64 miles away)</span></div><div
class="tel work">850-432-0202</div><ul>
[End of First Result]
[Start of Second Result]
<li id="mqresult-2" class="vcard"><b class="fn org">Crowne
Plaza</b><div class="adr"><span    class="street-address">200
E    Gregory   St,   Pensacola, FL</span><span class="distance">
(0.67 miles away)</span></div><div class=
"tel work">850-433-7572</div><ul>
       <li> <a
[End of Second Result]
```

The system scans this code to look for text corresponding to mileage. For the first entry, that text is "><span class="distance">(0.64 miles away)</." The system extracts the expression "0.64 miles" and compares it to the termination condition (a distance greater than 5 miles) (The reader should be aware that the system does more than simply extract the raw HTML code. It actually translates the information into a machine readable format so it can be used for further reasoning). Of course, if the system has trouble locating the mileage object, it can ask the user for help. The user would then select the distance display shown on the results page and say something like "Here it is."

Once the distance object is indicated, the system preferably transitions to the list parsing GUI so that the user may more easily understand and review the operations. This is shown in FIG. 13. The left column shows the search results. The center column shows the hotel names extracted from the search results. The right column shows the distance objects extracted from the search results. FIG. 13 actually shows the last three results in a fairly lengthy list. The hotel named "Tranquil Villas" is the last hotel found that meets the termination condition (within five miles). Thus, the system terminates the list creation at this point and only performs any further requested iteration operations on those results which meet the termination condition.

The system dynamically updates its lexicon. When a new web page is loaded, the system examines the words found in the page and compares them to its existing lexicon. Any previously unknown words are added. Without this expanding capability, the system will have difficulty recognizing and parsing phrases which include such words. The semantic-based object identification will fail too.

A good example of this issue is found at "www.microsoft.com," the support page for MICROSOFT. This page has a link labeled "Registration FAQ." The word "FAQ" may not be found in the system lexicon, but it is added when the web page is first loaded. If the user then utters the phrase "Select the registration FAQ link," the system will understand what is intended.

As previously explained in the examples, the system accommodates task revisions. A user can undo a step and reset the application. The user can take these actions using natural language such as "Scratch that" or "Undo that last step." The user can keep removing steps in reverse chronological order. The user can also change the environment in which PLOW is operating without inadvertently creating an unwanted step. As an example, if a web communication problem is encountered, the user can say "Let me reset the web browser." Once the operating environment is restored, the user can then say "Let's resume."

When a user starts a new task, the system first asks for the values of the task input parameters (In the last example, these would be the street address for the MAPQUEST proximity search). Once the values are provided, the system executes the task from the first step. Each step is completed when all actions associated with that step are completed. The default condition precedent for each successive step is the successful completion of the preceding step (except for the first step in the task). When a step is completed, the system commences the next step. A step can have additional preconditions such as "if" conditionals. Then, depending on the dynamic result of executing a step, a necessary precondition may or may not have been satisfied.

When a termination conditions is specified for a (sub) task, the system checks for satisfaction of the termination condition upon completion of the (sub) task. If the task is iteration and the termination condition is not satisfied, the system updates the iteration count and runs through the task again from the first step. The system keeps running through the task until the termination condition is satisfied.

The preceding description contains significant detail regarding the novel aspects of the present invention. It is should not be construed, however, as limiting the scope of the invention but rather as providing illustrations of the preferred embodiments of the invention. As an example, those skilled in the art will realize that the graphical user interfaces presented are rather simplistic examples of what would likely be employed. In addition, the code language used in the examples are only a few samples among literally millions of possibilities. The system understands a wide range of paraphrases. For instance, to indicate that a task model is complete the user might say "I'm done," "I'm finished with the procedure," "That's it," "We've completed the task," "That's all," or many other possibilities. The extensive lexicon and language processing capabilities allow the system to identify the same intention underlying each of these utterances. Thus, the scope of the invention should be fixed by the following claims, rather than by the examples given.

Having described our invention, we claim:

1. An interactive method for learning and executing executable tasks using language and demonstration inputs from a user, comprising:
   a. providing a computational device including a graphical user interface (GUI);
   b. providing software running on said computational device and supported GUI-based interaction with said user;
   c. wherein said user performs tasks using the GUI
   d. wherein said software includes a natural dialog-based interface whereby said user can communicate with said software using natural dialog-based language;
   e. for each of said executable tasks, recognizing said user's overall intent;
   f. for each of said executable tasks, identifying a plurality of steps needed to complete said task;
   g. for each of said plurality of steps, identifying and generalizing a step objective;
   h. learning to execute each of said steps from demonstrations provided by said user;
   i. providing incremental execution and interaction with said user using said natural dialog-based interface;
   j. providing a database for storing a task definition for each of said tasks, wherein said task definition includes said steps comprising said task and said step objectives;
   k. storing said task definitions in said database;
   l. for each of said tasks, learning semantic characterization of said task for later retrieval from said database;
   m. retrieving a particular task definition from said database using said semantic characterization;

n. improving said task definition for each of said tasks through practice, with instruction being provided by said user;
o. wherein one of said executable tasks returns a list of results;
p. displaying said list of results in a first configuration of said GUI wherein said GUI displays a list consisting of multiple Document Object Model nodes;
q. wherein said user provides natural language to said software running on said computational device indicating that iteration should be performed;
r. automatically creating a second configuration of said GUI wherein said GUI displays a plurality of cells arranged into columns and rows, with each row representing a single Document Object Model node from said displayed list;
s. wherein said user demonstrates a first task to be performed in a first Document Object Model node; and
t. wherein thereafter said software running on said computation device automatically performs said first task demonstrate by said user in all other Document Object Model nodes and displays a result of said performance in said second configuration of said GUI.

2. An interactive method for learning and executing as recited in claim 1, wherein the step of recognizing said user's overall intent for each of said executable tasks comprises:
   a. using an ontology of tasks;
   b. characterizing said user's actions within said ontology by observing said user's actions, objects with which said, user interacts, as well as natural dialog-based language descriptions of said actions and said objects provided by said user;
   c. using algorithms based on natural language grammars and lexicons to map sentences in said dialog to said ontology; and
   d. providing an ontology-driven learning of executable steps from observations of said user's actions.

3. An interactive method for learning and executing as recited in claim 1, wherein the step of providing software which includes a natural dialog-based interface whereby said user can communicate with said software using natural dialog-based language comprises:
   a. describing said tasks and said steps comprising said tasks in natural language;
   b. providing a grammar and lexicon with mapping rules to said ontology;
   c. using natural language processing techniques to convert said natural language provided by said user into a representation based on the ontology;
   d. having said software pose clarifying questions to said user expressed in natural language when needed;
   e. summarizing said task steps in natural language as said task steps are learned; and
   f. adding to said lexicon as new unknown words appear in said natural dialog-based interface.

4. An interactive method for learning and executing as recited in claim 1, further comprising:
   a detecting the start of each new step from language communicated by said user and observed user actions in said GUI;
   b. for each new step identifying the type of action required in said step in said ontology;
   c. for each new step, using the language describing, said step to identify one or more parameters to be used in said step;
   d. for each new step, if the intention of said new step is unclear, querying said user for additional information; and
   e. once a step is clearly defined, adding said step to said database.

5. An interactive method for learning and executing as recited in claim 2, further comprising:
   observing actions taken by said user in said GUI;
   b. retrieving internal encodings of GUI elements used in said observed user actions;
   c. defining a correlation between said descriptions provided by said user and said values entered or selected by said user in said actions;
   d. verifying learned patterns and interacting with said user when problems arise.

6. An interactive method for learning and executing as recited in claim 5, wherein said step of verifying, learned patterns and interacting with said user when problems arise comprises:
   a. simulating execution of said learned steps;
   b. in the event a problem arises, notifying said user of said problem; and
   c. accepting additional examples or descriptions from said user in order to correct said problem.

7. An interactive method for learning and executing as recited in claim 2, further comprising:
   a. upon receiving an indication from said user that a new task is to be learned, using said user's linguistic description to classify said new task into one of said task-specific ontologies;
   b. identifying input and output parameters for said new task according to the way said parameters were described by said user;
   c. allowing said user to explicitly describe additional parameters; and
   d. querying said user for clarification when said user's intent is not identified.

8. An interactive method for learning and executing as recited in claim 1, further comprising:
   a. receiving from said user a description of a task to be performed;
   b. encoding said described task in terms of task ontology;
   c. using said encoding to search said database in order to identify said task within said database;
   d. retrieving said task from said database, along with parameters needed to perform said task; and
   e. querying said user for values for any of said parameters which need to be specified.

9. An interactive method for learning and executing as, recited in claim 1, wherein said step of detecting the presence of iteration comprises identifying lists and tables.

10. An interactive, method for learning and executing as recited in claim 1, wherein for each of said plurality of steps taught by said user, said demonstrations of said user and a primary code object which is associated with said demonstrations of said user are correlated.

11. An interactive method for learning and executing as recited in claim 10, further comprising for each of said plurality of steps taught by said user, scanning other code objects in proximity to said primary code object which is associated with a particular said user demonstration to search for the presence of words defining said user's objective or synonyms therefor.

12. An interactive method for learning and executing as recited in claim 11, further comprising:
   a. for each of said plurality of steps taught by said user, creating a primary link between a particular said user demonstration and said primary code object and also creating a secondary link, between said particular user demonstration and said other code objects which relate to said word's defining said user's objective or synonyms therefor; and b. saving said primary and secondary links in said database.

13. An interactive method for learning and executing as recited in claim 2, wherein for each of said plurality of steps taught by said user, said demonstrations of said user and a primary code object which is associated with said demonstrations of said user are correlated.

14. An; interactive method for learning and executing as recited in claim 13, further comprising for each of said plurality of steps taught by said user, scanning other code objects in proximity to said primary code object which is associated with a particular said user demonstration to search for the presence of words defining said user's objective or synonyms therefor.

15. An interactive method for learning and executing as recited in claim 14, further comprising:
   a. for each of said plurality of steps taught by said user, creating a primary link between a particular said user demonstration and said primary code object and also creating a secondary link between said particular user demonstration and said other code objects which relate to said word's defining said user's objective or synonyms therefor; and
   b. saving said primary and secondary links in said database.

16. An interactive method for learning and executing as recited in claim 3, wherein for each of said plurality of steps taught by said user, said demonstrations of said user and a primary code object which is associated with said demonstrations of said user are correlated.

17. An interactive method for learning and executing as recited in claim 16, further comprising for each of said plurality of steps taught by said user, scanning other code objects in proximity to said primary code object which is associated with a particular said user demonstration to search for the presence of words defining said user's objective or synonyms therefor.

* * * * *